(12) United States Patent
Bemel-Benrud et al.

(10) Patent No.: US 10,416,866 B2
(45) Date of Patent: Sep. 17, 2019

(54) REPRESENTATION OF DIGITAL MAP STYLING PROPERTIES ACROSS ZOOM LEVELS

(71) Applicant: Mapbox, Inc., San Francisco, CA (US)

(72) Inventors: Saman Bemel-Benrud, Washington, DC (US); Thomas Christopher MacWright, Washington, DC (US); Eden Halperin, San Francisco, CA (US); Lauren Budorick, San Francisco, CA (US); Qian Gao, Washington, DC (US)

(73) Assignee: Mapbox, Inc., San Francisco, CA (US)

( * ) Notice: Subject to any disclaimer, the term of this patent is extended or adjusted under 35 U.S.C. 154(b) by 92 days.

(21) Appl. No.: 15/681,284

(22) Filed: Aug. 18, 2017

(65) Prior Publication Data

US 2018/0052596 A1 Feb. 22, 2018

Related U.S. Application Data

(60) Provisional application No. 62/376,868, filed on Aug. 18, 2016.

(51) Int. Cl.
*G06F 3/0484* (2013.01)
*G06T 11/20* (2006.01)
(Continued)

(52) U.S. Cl.
CPC ....... *G06F 3/04847* (2013.01); *G01C 21/367* (2013.01); *G06F 3/0482* (2013.01);
(Continued)

(58) Field of Classification Search
CPC .... G06F 16/2379; G06F 16/287; G06F 16/29; G06F 3/0482; G06F 3/04845;
(Continued)

(56) References Cited

U.S. PATENT DOCUMENTS

| 8,274,524 | B1* | 9/2012 | Cornell | ............... G08G 1/0969 |
| | | | | 345/428 |
| 8,937,627 | B1* | 1/2015 | Otero | .................... G06F 3/1423 |
| | | | | 345/619 |

(Continued)

OTHER PUBLICATIONS

United States Office Action, U.S. Appl. No. 15/681,290, dated May 17, 2018, 14 pages.

(Continued)

*Primary Examiner* — Jin Cheng Wang
(74) *Attorney, Agent, or Firm* — Fenwick & West LLP

(57) ABSTRACT

A process and system allow for visually representing style layer properties of a digital map across various zoom levels. From a style sheet for a digital map, a plurality of style layer properties for a style layer corresponding to the digital map are determined for rendering in the form of a visual map, including various property values for different zoom levels. From these, a zoom level function is generated between pairs of the values for a particular style layer property, by assigning property values (a continuous range or finite set) between the first property value and the second property value in the pair. A visual map based on vector map tiles rendered according to the zoom level function is displayed according to the selected zoom level. As values are changed, the visual map is updated to reflect the changes.

20 Claims, 7 Drawing Sheets

(51) Int. Cl.
*G06T 11/60* (2006.01)
*G06F 3/0482* (2013.01)
*G06F 16/29* (2019.01)
*G06F 16/28* (2019.01)
*G06F 16/23* (2019.01)
*G06F 3/0486* (2013.01)
*G01C 21/36* (2006.01)
*G09B 29/00* (2006.01)

(52) U.S. Cl.
CPC ........ *G06F 3/0486* (2013.01); *G06F 3/04845* (2013.01); *G06F 16/2379* (2019.01); *G06F 16/287* (2019.01); *G06F 16/29* (2019.01); *G06T 11/206* (2013.01); *G06T 11/60* (2013.01); *G09B 29/003* (2013.01); *G06F 2203/04806* (2013.01); *G06T 2200/24* (2013.01)

(58) Field of Classification Search
CPC .. G06F 3/04847; G06F 3/0486; G06T 11/206; G06T 11/60; G06T 2200/24
USPC .................................................. 345/440, 441
See application file for complete search history.

(56) References Cited

U.S. PATENT DOCUMENTS

| | | | |
|---|---|---|---|
| 2002/0175948 A1 | 11/2002 | Nielsen et al. | |
| 2005/0231392 A1* | 10/2005 | Meehan | G06Q 10/10 340/995.1 |
| 2009/0015596 A1* | 1/2009 | Fuchs | G01C 21/32 345/619 |
| 2013/0147794 A1 | 6/2013 | Lee et al. | |
| 2014/0340421 A1 | 11/2014 | Otero et al. | |
| 2014/0354629 A1 | 12/2014 | Adlers et al. | |
| 2015/0170385 A1 | 6/2015 | Appleton et al. | |
| 2016/0102983 A1 | 4/2016 | Javed et al. | |
| 2017/0052747 A1 | 2/2017 | Cervelli et al. | |
| 2017/0308549 A1* | 10/2017 | Sims | G06F 17/30 |

OTHER PUBLICATIONS

United States Office Action, U.S. Appl. No. 15/681,286, dated Jan. 11, 2019, 24 pages.
United States Office Action, U.S. Appl. No. 15/681,290, dated Dec. 14, 2018, 14 pages.

* cited by examiner

REPRESENTATION OF DIGITAL MAP STYLING PROPERTIES ACROSS ZOOM LEVELS

BENEFIT CLAIM

This application claims the benefit of provisional application 62/376,868, filed Aug. 18, 2016, the entire contents of which is hereby incorporated by reference as if fully set forth herein, under 35 U.S.C. § 119(e). This application also is related to non-provisional applications: 15/681,286, entitled "Providing Visual Selection of Map Data in a Digital Map," 15/681,228, entitled "Modifying Style Layer Properties of a Digital Map," and 15/681,290, entitled "Providing Graphical Indication of Label Boundaries in Digital Maps," each of which were filed on Aug. 18, 2017, and the entire contents of each is hereby incorporated by reference as if fully set forth herein.

BACKGROUND

While digital maps and graphical user interfaces for digital maps have entered wide use, creating such maps and interfaces is difficult using pre-existing software tools. Editing and authoring programs for creating digital map templates, colors, and features has been complex and required many manual operations. In particular, processes for customizing digital maps, or preparing digital maps in a manner that can adapt to other applications that use the maps, has been difficult or inconvenient. Therefore, there is a need for more flexible, comprehensive and convenient computer-based techniques for creating, modifying and manipulating digital maps and graphical user interfaces for digital computer display devices that display maps.

SUMMARY

As described herein, electronic map data is divided into a plurality of vector map tiles at a plurality of zoom levels, wherein each map tile corresponds to a portion of a geographic map. The map tiles are rendered when requested by a client, and each map tile is rendered based on one or more map styles, which defines the visual appearance of an electronic map, such as what map data to display in the electronic map, what order to render the data in, and how to style the data when it is rendered.

A map style comprises one or more map style layers, each of which may include a reference to a portion of electronic map data and one or more visual style rules to be applied to the portion of electronic map data. Map editing instructions are programmed or configured to cause display, in a graphical user interface of a computer display device and in association with a digital map, of one or more style layer properties of the digital map.

A process, and corresponding system for performing the process, is described herein for representing style layer properties at various zoom levels. The process determines, from a style sheet for a digital map, a plurality of style layer properties for a style layer corresponding to the digital map to be rendered as a visual map, including various property values for different zoom levels. From these, a zoom level function is generated between pairs of the values for a particular style layer property, by assigning property values (a continuous range or finite set) between the first property value and the second property value in the pair. A visual map based on vector map tiles rendered according to the zoom level function is displayed according to the selected zoom level. As values are changed, the visual map is updated to reflect the changes.

DETAILED DESCRIPTION

Figure 1A:
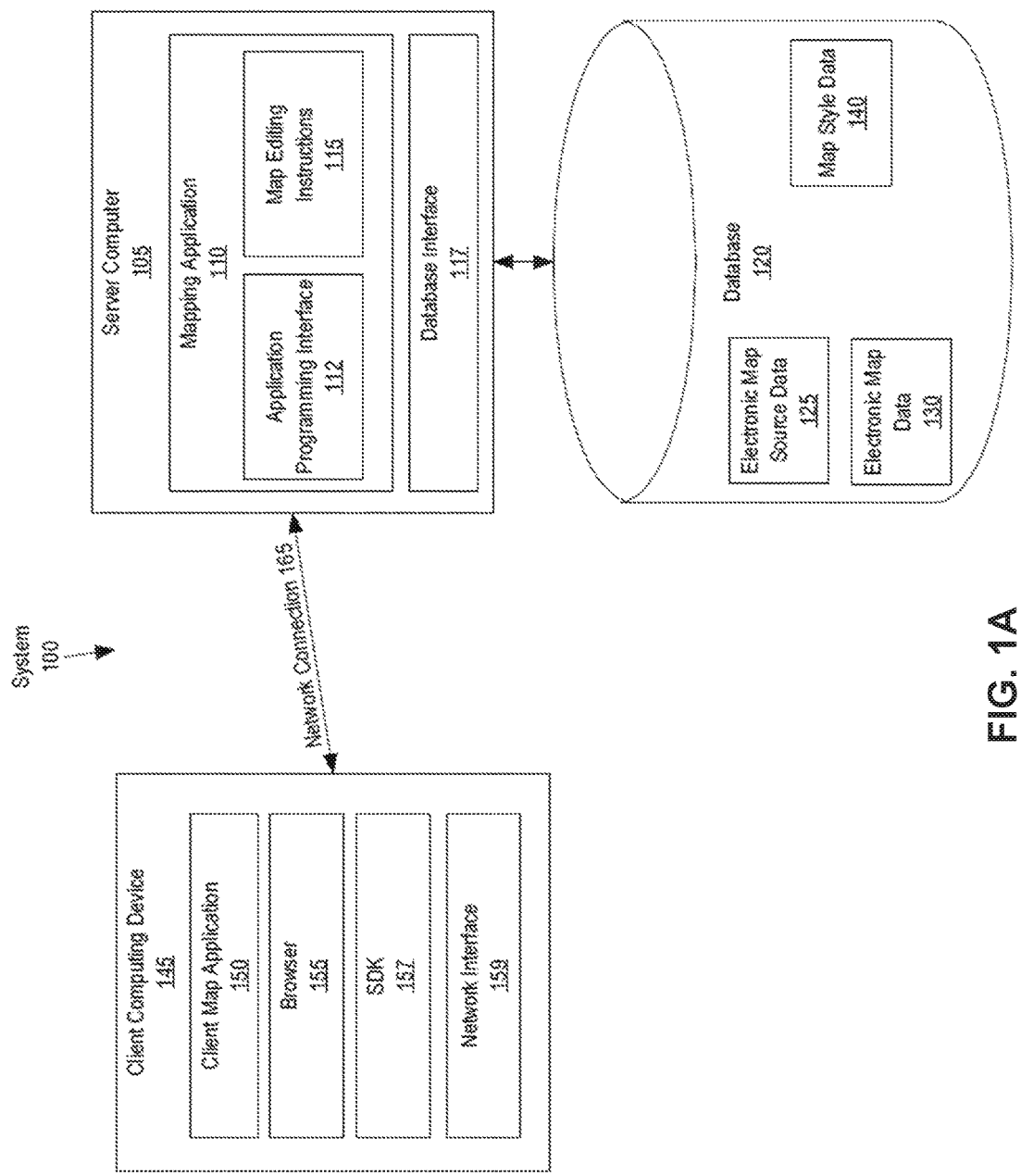
FIG. 1A illustrates an example computer system in which the techniques described herein may be practiced, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

System Overview

FIG. 1A illustrates an example computer system in which the techniques described may be practiced, according to one embodiment.

In an embodiment, a computer system 100 comprises a plurality of components that may be implemented at least partially by hardware at one or more computing devices, such as one or more hardware processors executing stored program instructions stored in one or more memories for performing the functions that are described herein. In other words, in an embodiment, all functions described herein are intended to indicate operations that are performed using programming in a special-purpose computer or general-purpose computer, in various embodiments. FIG. 1A illustrates only one of many possible arrangements of components configured to execute the programming described herein. Other arrangements may include fewer or different components, and the division of work between the components may vary depending on the arrangement.

FIG. 1A illustrates a client computing device 145 that is coupled via a network connection 165 to a server computer 105, which is coupled to a database 120. The server computer comprises a mapping application 110, an application programming interface (API) 112, map editing instructions 115, and a database interface 117. The database 120 comprises electronic map source data 125, electronic map data 130, and map style data 140. The client computing device 145 comprises a client map application 150, browser 155, and wireless network interface 159.

In one embodiment, client computing device 145 is any computing device, such as a work station, personal computer, general purpose computer, laptop, hand-held computer, wearable computer, cellular or mobile phone, portable digital assistant (PDA), tablet computer, and the like. Although a single client computing device is depicted in FIG. 1A, any number of client computing devices may be present. Each client computing device 145 is communicatively connected to server computer 105 through network connection 165 which comprises any combination of a LAN, a WAN, one or more internetworks such as the public Internet, a cellular network, or a company network.

Client computing device 145 also includes network interface 159, which is used by the client computing device 145 to communicate with other devices. In particular, network interface 159 is used to establish network connection 165 to server computer 105. Network interface 159 may use Ethernet, WiFi, WiMAX, Bluetooth, ZigBee, cellular standards, or others.

Client computing device 145 also includes other hardware elements, such as one or more input devices, memory, processors, and the like, which are not depicted in FIG. 1A. Client computing device 145 also includes applications, software, and other executable instructions to facilitate various aspects of embodiments described herein. These applications, software, and other executable instructions may be installed by a user, owner, manufacturer, or other entity related to the client computing device.

In one embodiment, client computing device 145 includes client map application 155 which is software that displays, uses, supports, or otherwise provides electronic mapping functionality as part of the application or software. Client map application 155 may be any type of application, such as a taxi service, a video game, a chat client, a food delivery application, etc. In an embodiment, client map application 155 obtains electronic mapping functions through SDK 157, which may implement functional calls, callbacks, methods, or other programmatic means for contacting the server computer to obtain digital map tiles, layer data, or other data that can form the basis of visually rendering a map as part of the application. In general, SDK 157 is a software development kit that allows developers to implement electronic mapping without having to design all of the components from scratch. For example, SDK 157 may be downloaded from the Internet by developers, and subsequently incorporated into an application which is later used by individual users.

In one embodiment, client computing device 145 includes browser 155. Browser 155 is a computer application that may request and execute instructions received from web servers to generate complex user interfaces that are presented to a user through one or more devices, such as a display or speakers. In response to input from a user, such as a mouse click indicating that the user selected an object defined in the instructions, such as a button or a text box, a browser may send a request based on the selected object to the web server. The request may be a request for data or include data to be processed by the web server. In an embodiment, browser 155 may receive instructions from server computer 105 to generate a user interface of a map editing program through which a user may create and modify map styles. Additionally or alternatively, client computing device 145 may include a map editing application or software that provides map editing functions as part of the application or software.

Server computer 105 may be any computing device, including but not limited to: servers, racks, work stations, personal computers, general purpose computers, laptops, Internet appliances, wireless devices, wired devices, multi-processor systems, mini-computers, and the like. Although FIG. 1A shows a single element, the server computer 105 broadly represents one or more multiple server computers, such as a server cluster, and the server computer 105 may be located in one or more physical locations. Server computer 105 may also represent one or more virtual computing instances that execute using one or more computers in a datacenter such as a virtual server farm.

Server computer 105 is communicatively connected to database 120 and client computer device 145 through any kind of computer network using any combination of wired and wireless communication, including, but not limited to: a Local Area Network (LAN), a Wide Area Network (WAN), one or more internetworks such as the public Internet, or a company network. Server computer 105 may host or execute mapping application 110, and may include other applications, software, and other executable instructions, such as database interface 117, to facilitate various aspects of embodiments described herein.

In one embodiment, database interface 117 is a programmatic interface such as JDBC or ODBC for communicating with database 120. Database interface 117 may communicate with any number of databases and any type of database, in any format. Database interface 117 may be a piece of customer software created by an entity associated with mapping application 110, or may be created by a third party entity in part or in whole.

In one embodiment, database 120 is a data storage subsystem consisting of programs and data that is stored on any suitable storage device such as one or more hard disk drives, memories, or any other electronic digital data recording device configured to store data. Although database 120 is depicted as a single device in FIG. 1A, database 120 may span multiple devices located in one or more physical locations. For example, database 120 may include one or nodes located at a data warehouse(s). Additionally, in one embodiment, database 120 may be located on the same device(s) as server computer 105. Alternatively, database 120 may be located on a separate device(s) from server computer 105.

Database 120 may be in any format, such as a relational database, a noSQL database, or any other format. Database 120 is communicatively connected with server computer 105 through any kind of computer network using any combination of wired and wireless communication of the type previously described. Optionally, database 120 may be communicatively connected with other components, either directly or indirectly, such as one or more third party data suppliers. Generally, database 120 stores data related to electronic maps including, but not limited to: electronic map source data 125, electronic map data 130, map tile filter 135, and map style data 140. These datasets may be stored as columnar data in a relational database or as flat files.

In one embodiment, electronic map source data 125 is raw digital map data that is obtained, downloaded, or received from a variety of sources. The raw digital map data may include satellite images, digital street data, building or place data, or terrain data. Example sources include National Aeronautics and Space Administration (NASA), United States Geological Survey (USGS), and DigitalGlobe. Raw digital map data may also be defined by a user and uploaded to the server computer. Electronic map source data 125 may be updated at any suitable interval, and may be stored for any amount of time. Once obtained or received, electronic map source data 125 is used to generate electronic map data 130.

In one embodiment, electronic map data 130 is digital map data that is provided, either directly or indirectly, to client map applications, such as client map application 155, using an API. Electronic map data 130 is based on electronic map source data 125. Specifically, electronic map source data 125 is processed and organized as a plurality of vector map tiles which may be subject to map style data to impose different display styles. Electronic map data 130 may be updated at any suitable interval, and may include additional information beyond that derived from electronic map source data 125.

In an embodiment, electronic map data is divided into a plurality of vector map tiles at a plurality of zoom levels, wherein each map tile corresponds to a portion of a geographic map. For example, a map tile may correspond to a square area of a geographic map at a particular zoom level, or an area of a pre-defined size and location within a geographic map. In an embodiment, the portion of electronic map data within each map tile may be organized in a compact, structured format, such as the Mapbox Vector Tile Specification format, by Mapbox, Inc., San Francisco, Calif. Additionally or alternatively, electronic map data 130 may comprise a plurality of map tile sets. A first set of map tiles may include electronic map data derived from a first set of electronic map source data, while a second set of map tiles may include electronic map data derived from a second set of electronic map source data.

In an embodiment, a map tile contains data describing map geometries, such as points, lines, and polygons, of features on the map. Additionally or alternatively, the map tile contains metadata, such as road names, place names, house numbers, feature types, and other properties. For example, electronic map data in a vector map tile corresponding to a portion of a geographic map may include geometry data representing roads, buildings, water, parks, and etc. to be depicted within the portion of the geographic map, as well as geometries for suggested placement of labels and other cartographic features. The map tile may also include metadata corresponding to each feature, such as names that can be rendered as labels on a digital map. Additionally or alternatively, the metadata includes data indicating the portion of the geographic map that the map tile corresponds to. For example, the metadata may include data indicating one or more coordinates of the map tile or one or more boundaries of the map tile. Additionally or alternatively, the metadata includes data indicating the zoom level at which that map tile is to be displayed.

In an embodiment, electronic map data is further organized into a plurality of data layers. Electronic map data may describe a plurality of map features, such as buildings, water, roads, etc. The map features may be grouped into the plurality of data layers. For example, a "Road" data layer may include map features such as streets, bridges, freeways, paths, and etc. As another example, a "Water" data layer may include map features such as rivers, lakes, oceans, canals, and etc.

In an embodiment, map tiles are used by program libraries and SDKs, such as SDK 157, as part of displaying maps on a mobile computing device or a browser. A map application or a browser may request one or more map tiles and process the map tiles to cause display of a visual map.

In an embodiment, map tiles are rendered when requested by a client, like a web browser or a mobile application. Rendering may be performed by a rendering library of a client map application or on a server computer. Example rendering libraries include, but are not limited to, Mapbox GL JS, available from Mapbox, Inc., San Francisco, Calif., the Mapbox iOS SDK, Mapbox Android SDK, the Mapbox GL native renderer, or through a Mapbox API.

In an embodiment, a map tile is rendered based on a map style. Each map style of a plurality of map styles can be used to render the same map tile. In other words, the same portion of electronic map data may be displayed in a variety of visual styles. For example, in one map application, map tiles may be displayed with dark colors while in a second map application, map tiles may be displayed with light colors. Additionally or alternatively, the electronic map data required may differ based on map style. For example, in one map application, roads within a map tile may be displayed while buildings are not displayed. In another map application, landscape and rivers may be displayed while roads are not displayed.

In one embodiment, map style data 140 is digital data that defines one or more visual map styles for electronic maps. May style data 140 may comprise a plurality of map styles. A map style defines the visual appearance of an electronic map, such as what map data to display in the electronic map, what order to render the data in, and how to style the data when it is rendered. In an embodiment, a map style may include information including, but not limited to, references to portions of electronic map data 130, map images, fonts, and rules specifying how the portions of electronic map data 130 should be styled when rendering a digital map, such as colors, line styles, line thickness, and etc.

In an embodiment, each map style may be stored as a document. For example, a map style may be stored as a JSON object that adheres to a particular style format specification. A map style may be generated using a map editing program or written independently and uploaded to a server computer.

In an embodiment, a map style comprises one or more map style layers. Each map style layer may include a reference to a portion of electronic map data and one or more visual style rules to be applied to the portion of electronic map data. In an embodiment, the reference to the portion of electronic map data specifies a particular map data source for the maps style layer. For example, the map style may specify a particular map tile set from a plurality of map tile sets as the map data source for the style layer. Additionally or alternatively, the map style layer may specify a particular data layer within the map tile set to associate with the style layer. For example, a style layer may specify visual style rules for a "Water" data layer of a set of map tiles.

In an embodiment, style layer data may include data indicating a style layer type for a map style layer. A map style layer may be a particular map style layer type, such as lines, polygons, symbols, circles, 3D polygons, and images. Additionally or alternatively, the style layer data may specify property values for one or more style layer properties associated with the style layer type. The style layer data may include data indicating property values to associate with each style layer property. In an embodiment, a property value may be a static value. Additionally or alternatively, the property value may be a dynamic value. For example, the property value may be a zoom level dependent value, such as a function that outputs a property value based on an input zoom level.

Each style layer type has a set of properties for which values may be specified. For example, a line style layer type may include style layer properties such as line width, line color, line style (solid, dotted, dashed), line cap style, line positioning, etc. As another example, a polygon style layer type may include style layer properties such as fill color, fill pattern, opacity, anti-aliasing, fill outline color, polygon positioning, etc.

In an embodiment, mapping application 110 provides the API 112 that may be accessed, for example, by client map application 155 using SDK 157 to provide electronic mapping to client map application 155. Specifically, mapping application 110 comprises program instructions that are programmed or configured to perform a variety of backend functions needed for electronic mapping including, but not limited to: receiving map tile requests from client computing devices, sending electronic map data to client computing devices, receiving map style data 140 from map editing applications, receiving electronic map source data 125 from data providers, processing electronic map source data 125 to generate electronic map data 130, and any other aspects of embodiments described herein. Mapping application 110 includes map editing instructions 115 which are programmed or configured to receive and store modified map style data. Additionally or alternatively, map editing instructions 115 may include instructions to perform the process as detailed in FIG. 6.

In one embodiment, map editing instructions 115 are programmed or configured to cause display, in a graphical user interface of a computer display device and in association with a digital map, of one or more style layer properties of the digital map, wherein a first zoom level value and a second zoom level value are associated with a first property value for a particular style layer property. Map editing instructions 115 may be further programmed or configured to receive a second property value in association with the second zoom level, associate the second property value with the second zoom level, and generate a zoom level function for the style layer property based on the first property value and the second property value. In an embodiment, a zoom level function assigns one or more property values to one or more zoom levels.

Additionally or alternatively, map editing instructions 115 may include instructions to store the zoom level function in map style data 140 in association with the style layer property.

In an embodiment, map editing instructions 115 may include instructions for causing display of a graphical user interface of a map editing program at client computing devices. Map editing instructions 115 may generate and send instructions to browser 155 to generate the graphical user interface. Additionally or alternatively, map editing instructions 115 may provide data to a map editing application or other software that provides map editing functions as part of the application or software. For example, map editing instructions may send map style data to a map editing application, receive new or updated map style data, and store received map style data to map style data 140.

A map editing program may be used to design a map to a user's specifications by allowing a user to select or upload map data, add custom fonts and images, or define and edit map styles, among other features. In an embodiment, a map editing program includes a map style editor creating custom map styles to a user's specifications. The map style editor may include a graphical user interface through which a user can define a custom map style or edit existing map styles.

Additionally or alternatively, the map style editor may include a visual map. The visual map may be displayed in conjunction with one or more map style layer properties. In an embodiment, the visual map is rendered based on the map style being edited in the map style editor. As changes are made to style layer properties, the visual map may be updated to reflect the changes. For example, if a user specifies a new width property value for roads, the map style editor may automatically re-display the visual map and render any roads shown within the map area using the new width property value.

According to one embodiment, the techniques described herein are implemented by one or more special-purpose computing devices. For example, the server computer 105 and client computing device 145 may be computer devices configured as special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 1B:
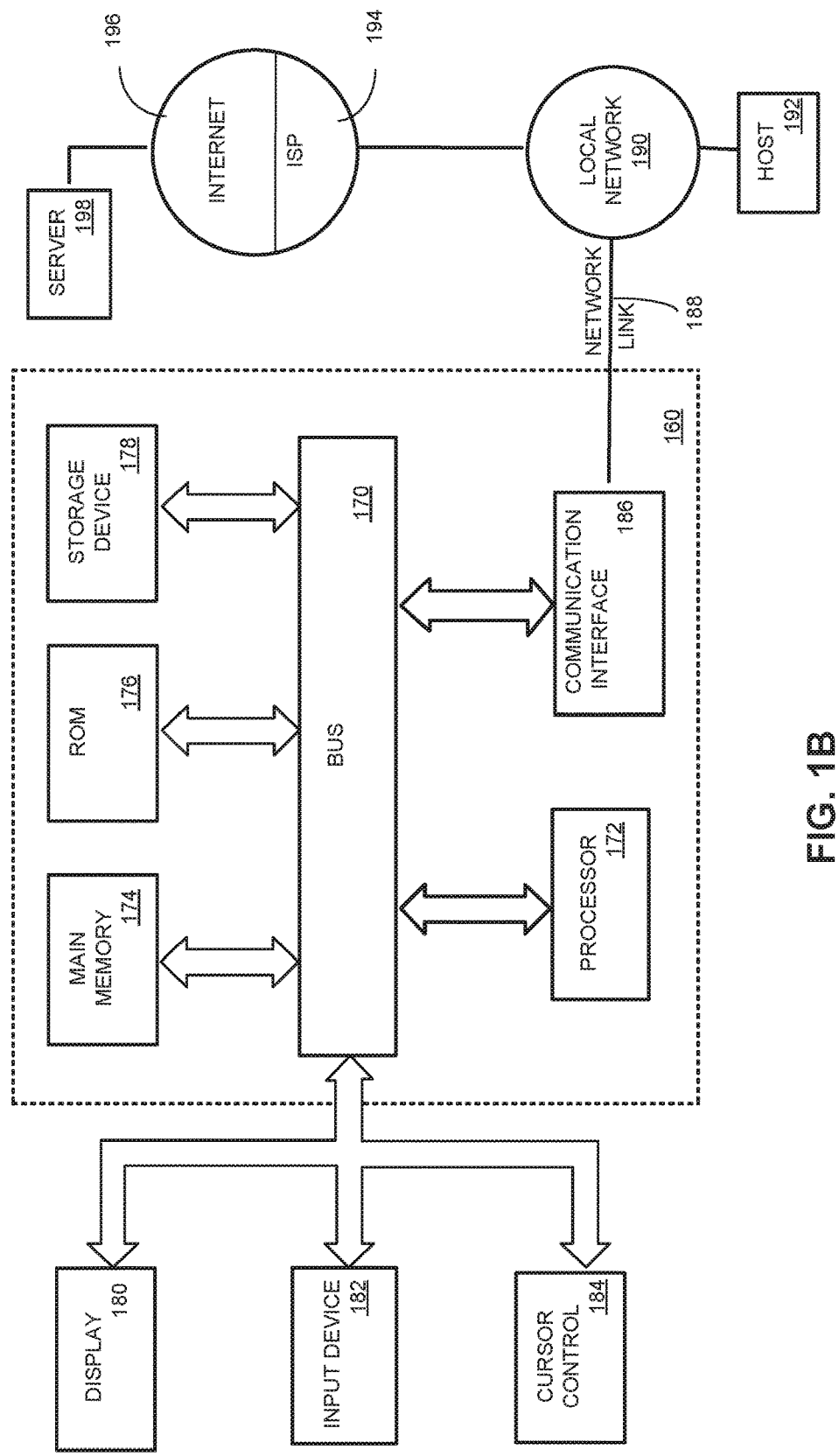
FIG. 1B illustrates a computer system upon which an embodiment may be implemented.

For example, FIG. 1B is a block diagram that illustrates a computer system 160 upon which an embodiment of the invention may be implemented. Computer system 160 includes a bus 170 or other communication mechanism for communicating information, and a hardware processor 172 coupled with bus 170 for processing information. Hardware processor 172 may be, for example, a general purpose microprocessor.

Computer system 160 also includes a main memory 174, such as a random access memory (RAM) or other dynamic storage device, coupled to bus 170 for storing information and instructions to be executed by processor 172. Main memory 174 also may be used for storing temporary variables or other intermediate information during execution of instructions to be executed by processor 172. Such instructions, when stored in non-transitory storage media accessible to processor 172, render computer system 160 into a special-purpose machine that is customized to perform the operations specified in the instructions.

Computer system 160 further includes a read only memory (ROM) 176 or other static storage device coupled to bus 170 for storing static information and instructions for processor 172. A storage device 178, such as a magnetic disk, optical disk, or solid-state drive is provided and coupled to bus 170 for storing information and instructions.

Computer system 160 may be coupled via bus 170 to a display 180, such as a cathode ray tube (CRT), LCD screen, LED screen, or touch screen, for displaying information to a computer user. An input device 182, which may include alphanumeric and other keys, buttons, a mouse, a touchscreen, or other input elements, is coupled to bus 170 for communicating information and command selections to processor 172. In some embodiments, the computer system 160 may also include a cursor control 184, such as a mouse, a trackball, or cursor direction keys for communicating direction information and command selections to processor 172 and for controlling cursor movement on display 180. The cursor control 184 typically has two degrees of freedom in two axes, a first axis (e.g., x) and a second axis (e.g., y), that allows the device to specify positions in a plane.

Computer system 160 may implement the techniques described herein using customized hard-wired logic, one or more ASICs or FPGAs, firmware and/or program logic which in combination with the computer system causes or programs computer system 160 to be a special-purpose machine. According to one embodiment, the techniques herein are performed by computer system 160 in response to processor 172 executing one or more sequences of one or more instructions contained in main memory 174. Such instructions may be read into main memory 174 from another storage medium, such as storage device 178. Execution of the sequences of instructions contained in main memory 174 causes processor 172 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 178. Volatile media includes dynamic memory, such as main memory 174. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 170. Transmission media can also take the form of acoustic, radio, or light waves, such as those generated during radio-wave and infra-red data communications, such as WI-FI, 3G, 4G, BLUETOOTH, or wireless communications following any other wireless networking standard.

Various forms of media may be involved in carrying one or more sequences of one or more instructions to processor 172 for execution. For example, the instructions may initially be carried on a magnetic disk or solid-state drive of a remote computer. The remote computer can load the instructions into its dynamic memory and send the instructions over a telephone line using a modem. A modem local to computer system 160 can receive the data on the telephone line and use an infra-red transmitter to convert the data to an infra-red signal. An infra-red detector can receive the data carried in the infra-red signal and appropriate circuitry can place the data on bus 170. Bus 170 carries the data to main memory 174, from which processor 172 retrieves and executes the instructions. The instructions received by main memory 174 may optionally be stored on storage device 178 either before or after execution by processor 172.

Computer system 160 also includes a communication interface 186 coupled to bus 170. Communication interface 186 provides a two-way data communication coupling to a network link 188 that is connected to a local network 190. For example, communication interface 186 may be an integrated services digital network (ISDN) card, cable modem, satellite modem, or a modem to provide a data communication connection to a corresponding type of telephone line. As another example, communication interface 186 may be a local area network (LAN) card to provide a data communication connection to a compatible LAN. Wireless links may also be implemented. In any such implementation, communication interface 186 sends and receives electrical, electromagnetic or optical signals that carry digital data streams representing various types of information.

Network link 188 typically provides data communication through one or more networks to other data devices. For example, network link 188 may provide a connection through local network 190 to a host computer 192 or to data equipment operated by an Internet Service Provider (ISP) 194. ISP 194 in turn provides data communication services through the world wide packet data communication network now commonly referred to as the "Internet" 196. Local network 190 and Internet 196 both use electrical, electromagnetic or optical signals that carry digital data streams. The signals through the various networks and the signals on network link 188 and through communication interface 186, which carry the digital data to and from computer system 160, are example forms of transmission media.

Computer system 160 can send messages and receive data, including program code, through the network(s), network link 188 and communication interface 186. In the Internet example, a server 198 might transmit a requested code for an application program through Internet 196, ISP 194, local network 190 and communication interface 186.

The received code may be executed by processor 172 as it is received, and/or stored in storage device 178, or other non-volatile storage for later execution.

User Interfaces and Process Flow

Figure 2:
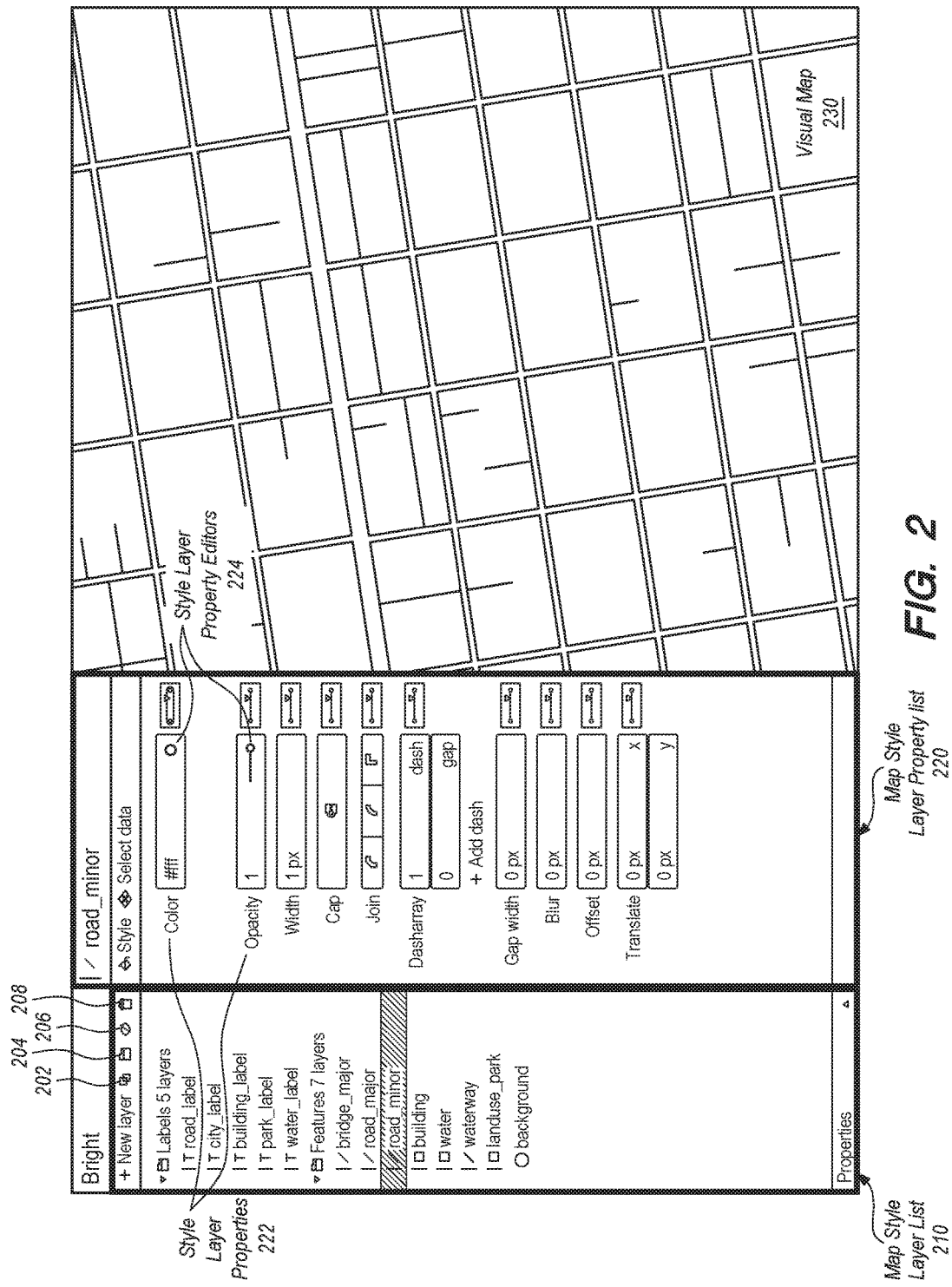
FIG. 2 illustrates a map style editor according to an embodiment.

FIG. 2 illustrates an example graphical user interface of a map style editor. The map style editor includes style layer list 210, style layer property list 220, and visual map 230.

In an embodiment, style layer list 210 displays a list of style layers and style layer groups for the selected map style. Additionally or alternatively, the style layer list 210 indicates the number of layers within each layer group next to the name of the layer group. In the illustrated example, map style layer list 210 lists a plurality of style layers and style layer groups for a map style titled "Bright."

Additionally or alternatively, a user can create, sort, group, and delete layers using the map style editor. In the illustrated example, style layer list 210 includes a toolbar comprising a new layer button, a duplicate layer button 202, a group/ungroup layers button 204, a show/hide layers button 206, and a delete layer button 208. The new layer button causes the map style editor to display a dialog for specifying map data styled by the map style layer, such as a source map tile set, style layer filters, and other information for creating a new map style layer. The duplicate layer button 202 allows a user to copy a style layer or a group of style layers. The group/ungroup layers button 204 groups multiple selected layers or ungroups a group of style layers. The show/hide layers button 206 shows or hides one or more selected style layers on the map. The delete layer button 208 deletes one or more selected style layers from the map style.

Figure 5:
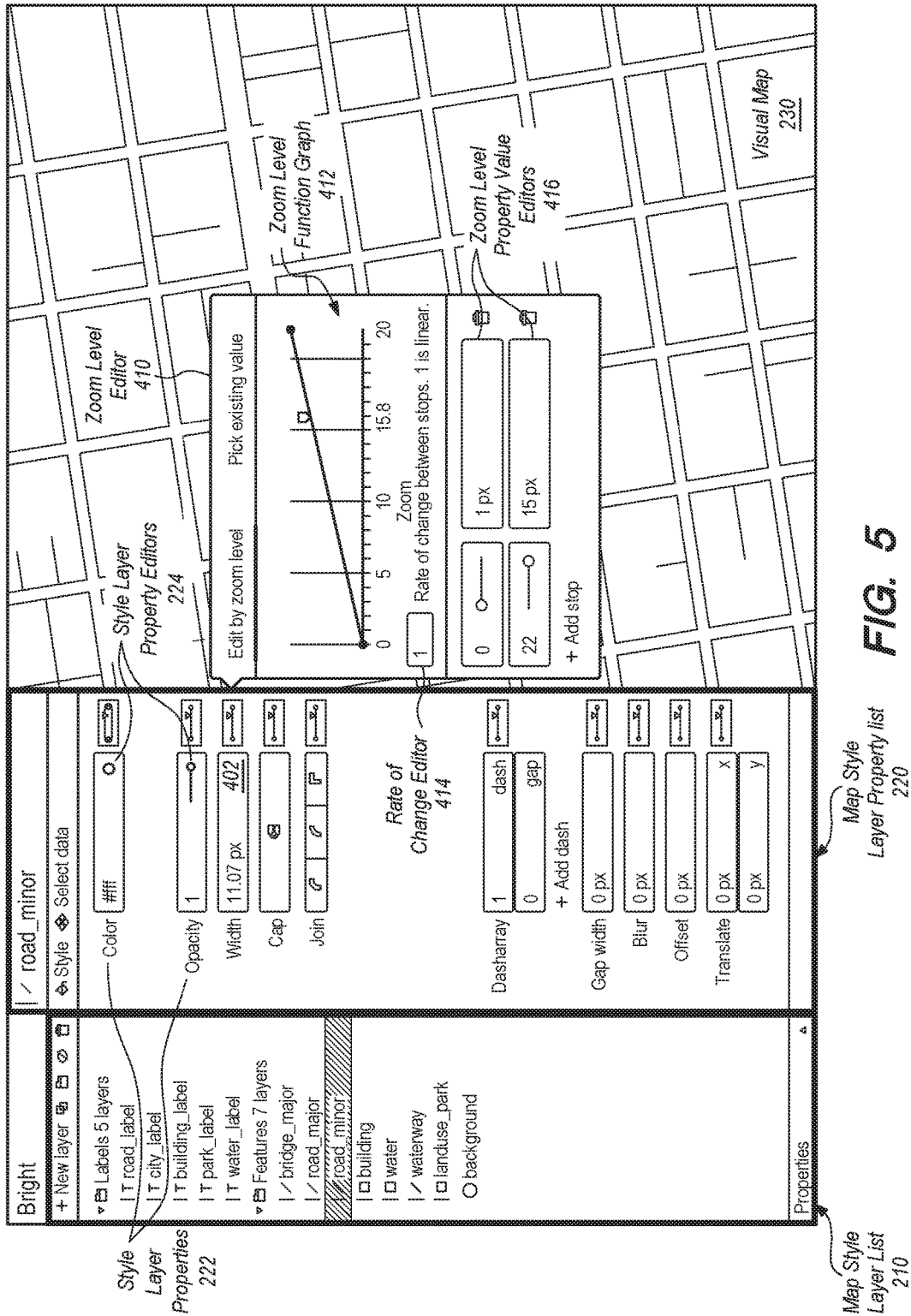
FIG. 5 illustrates the zoom level editor after receiving a property value from a user.
Figure 6:
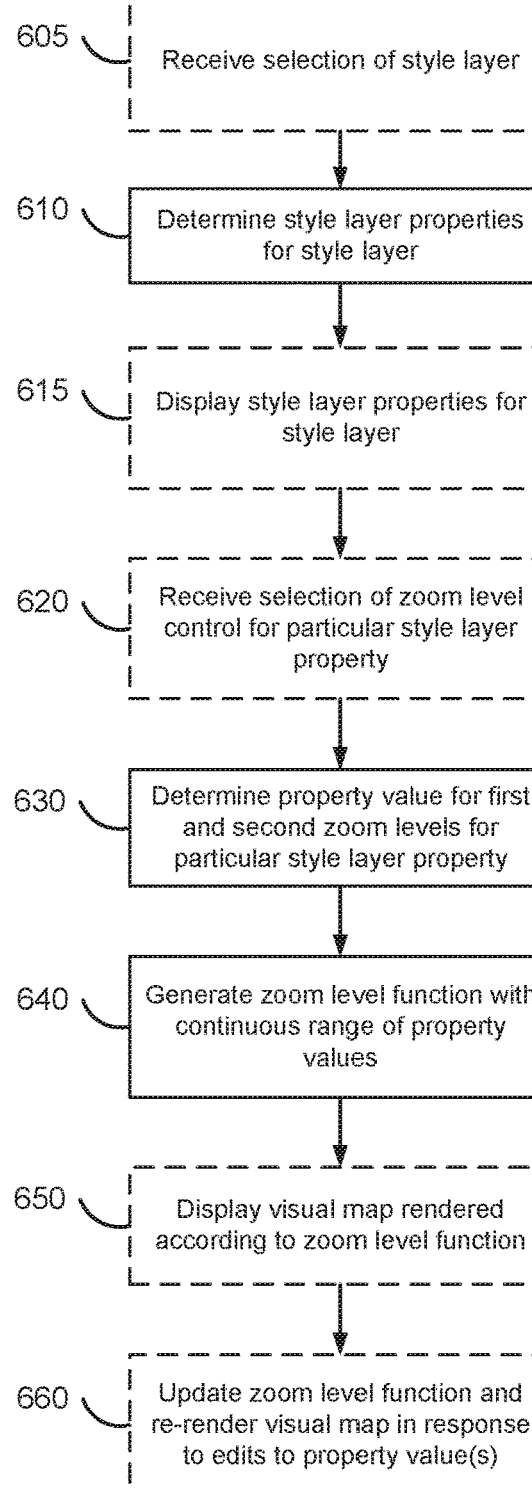
FIG. 6 illustrates a flowchart of a process for representing style layer properties at various zoom levels, according to an embodiment.

Referring now also to FIG. 6, a flowchart is shown of a process 600 for representing style layer properties at various zoom levels, according to one embodiment. In various embodiments, the operations of the process 600 of FIG. 6 may be implemented in programming by a server computer 105 or its components as described herein. For example, the operations of process 600 may be performed by the mapping application 110 according to map editing instructions 115 as described with reference to FIGS. 1-5. In some examples, the server computer 105 may execute a set of instructions or sequence of instructions (e.g., the map editing instructions 115) to control the functional elements of server computer 105 to perform the functions described below. Additionally or alternatively, server computer 105 may perform aspects of the functions described below using special-purpose hardware. In some embodiments, the map editing instructions 115 may instruct the server computer to interact with the database 120 to perform the functions described below using database interface 117. The process 600 steps with dashed outlines represent optional steps. In some embodiments, one or more functions described below may be performed by the client computing device 145.

Initially, the server computer 105 executing the mapping application 110 determines 610, from a style sheet for a digital map, a plurality of style layer properties for a style layer corresponding to the digital map to be rendered as a visual map at a plurality of zoom levels. The server computer 105 may first receive 605 selection of the style layer from a plurality of style layers, e.g., via user input in a user interface as described in FIGS. 2-5. Once determined 510, the server computer 105 executing the mapping application 110 displays 615 the plurality of style layer properties for the selected style layer, e.g., in a visual map portion of the user interface (e.g., 230). The user also may provide, and the server computer 105 receive, user input specifying a property value to associate with at least one of the plurality of zoom levels for the particular style layer property.

Referring again to FIG. 2, in an embodiment, selecting one or more style layers in the style layer list 210 allows a user to view and edit the properties for the selected layer(s). In the illustrated example, the "road_minor" style layer is selected in style layer list 210. Style layer property list 220 displays style layer properties that are associated with a selected style layer. Additionally or alternatively, style layer property list 220 displays the property value assigned to each style layer property. In the present example, style layer property list 220 includes a plurality of style layer properties for the "road_minor" style layer, such as the ones indicated by the label style layer properties 222.

In an embodiment, style layer property list 220 includes a property editor for one or more style layer properties, such as the style layer property editors 224 indicated for style layer properties 222. In the example illustrated in FIG. 2, the Color, Width, and Opacity style layer properties each have a corresponding text field. The text fields indicate the current value of each style layer property.

A user may select a value for the property or edit an existing value for the property using the property editor. For example, selecting a property editor may bring up a graphical editor where the user can select a value for the property, such as a color selection panel for the Color property. As another example, a user may edit the property value by typing or pasting text into the text field, or adjust a numerical value using arrow keys. Other properties may have buttons or other types of user interface components that allow a user to select or specify a property value.

Referring again to the process 600 of FIG. 6, the server computer 105 executing the mapping application 110 receives 620, e.g., from the user, selection of the zoom level control corresponding to the particular style layer property. In response to receiving selection of a zoom level control corresponding to a particular style layer property of the plurality of style layer properties having incremental values, the server computer 105 determines 630 at least a first property value for a first zoom level and a second property value for a second zoom level for the particular style layer property.

In an embodiment, selecting a property editor may cause the map style editor to display a graphical editor where the user can select an existing property value. An existing property value may include other values assigned to the same style property in other style layers. For example, if a line color property is selected, the map style editor may display a list of line colors used in other style layers. Existing values may also include values for other properties that have a similar value type. For example, selecting a style property with a color property value may cause the map style editor to display a list of all colors used in other style layers of the map, such as other line colors, fill colors, text color, and etc. Selecting an existing style property value sets the value of the selected style property.

In an embodiment, if a layer group is selected, editing a style layer property sets the property value for every style layer within the style layer group. If style layers within a style layer group have different values for the same style layer property, the map style editor may display a list of the different property values and let the user select a property value to apply to the style layer property for all style layers in the style layer group. In an embodiment, only style layers of the same style layer type—symbols, circles, fills, lines, backgrounds, or polygons—can be edited together. If a selection includes more than one style layer type, the map style editor may offer a selection of style layer types for a user to select and narrow down to a single type.

Referring again to FIG. 2, visual map 230 is a visual representation of a particular area of a digital map. In an embodiment, one or more map tiles corresponding to the particular area of the digital map are requested and processed in order to render the visual map. Visual map 230 may be updated or re-redisplayed as a user pans or zooms the map. Additionally or alternatively, visual map 230 may be rendered based on the selected map style that is being edited in the map style editor. When changes are made to the map style, the map style editor may update or re-display visual map 230. In other words, visual map 230 may provide a real-time representation of how digital maps will look if rendered using the selected map style.

Zoom Level Functions

In an embodiment, a digital map may be displayed at any zoom level of a plurality of different zoom levels. As used herein, a plurality of zoom levels may mean a plurality of discrete zoom levels or a continuous range of values between a minimum and a maximum zoom level value. For example, a digital map may be displayed at zoom levels from 0 to 22. The plurality of zoom levels may be discrete values between 0 and 22, such as 1, 2, 3, and etc. Additionally, the plurality of zoom levels may include all values between 0 and 22, including fractional values.

In some embodiments, vector map tiles may be rendered at any zoom level, including fractional zoom levels such as 2.01, 2.02, and etc. As the map is zoomed in or out, the desired visual appearance and property values associated with the visual appearance for a style layer may change. For example, the width, color, or opacity of roads may change when a user zooms in on the map and the map is re-displayed at an updated zoom level. As another example, certain map features, such as buildings or side streets, may only need to be displayed at certain zoom levels.

In an embodiment, style layers of a map style may include zoom-dependent styling that changes property values assigned to style layer properties based on the particular zoom level at which a digital map is displayed. A style layer property may be associated with a plurality of property values, wherein each property value is assigned to a particular zoom level.

In an embodiment, in order to associate a style layer property with a plurality of property values, the style layer property may be associated with a zoom level function. A zoom level function is a function that, given a particular input zoom level, determines a corresponding property value. In an embodiment, a zoom level function may be generated based on two different property values, where each property value is associated with a different zoom level. The zoom level function assigns property values to zoom levels between the two different zoom levels. In an embodiment, the zoom level function interpolates the values between the two property values to assign the property values.

Figure 3:
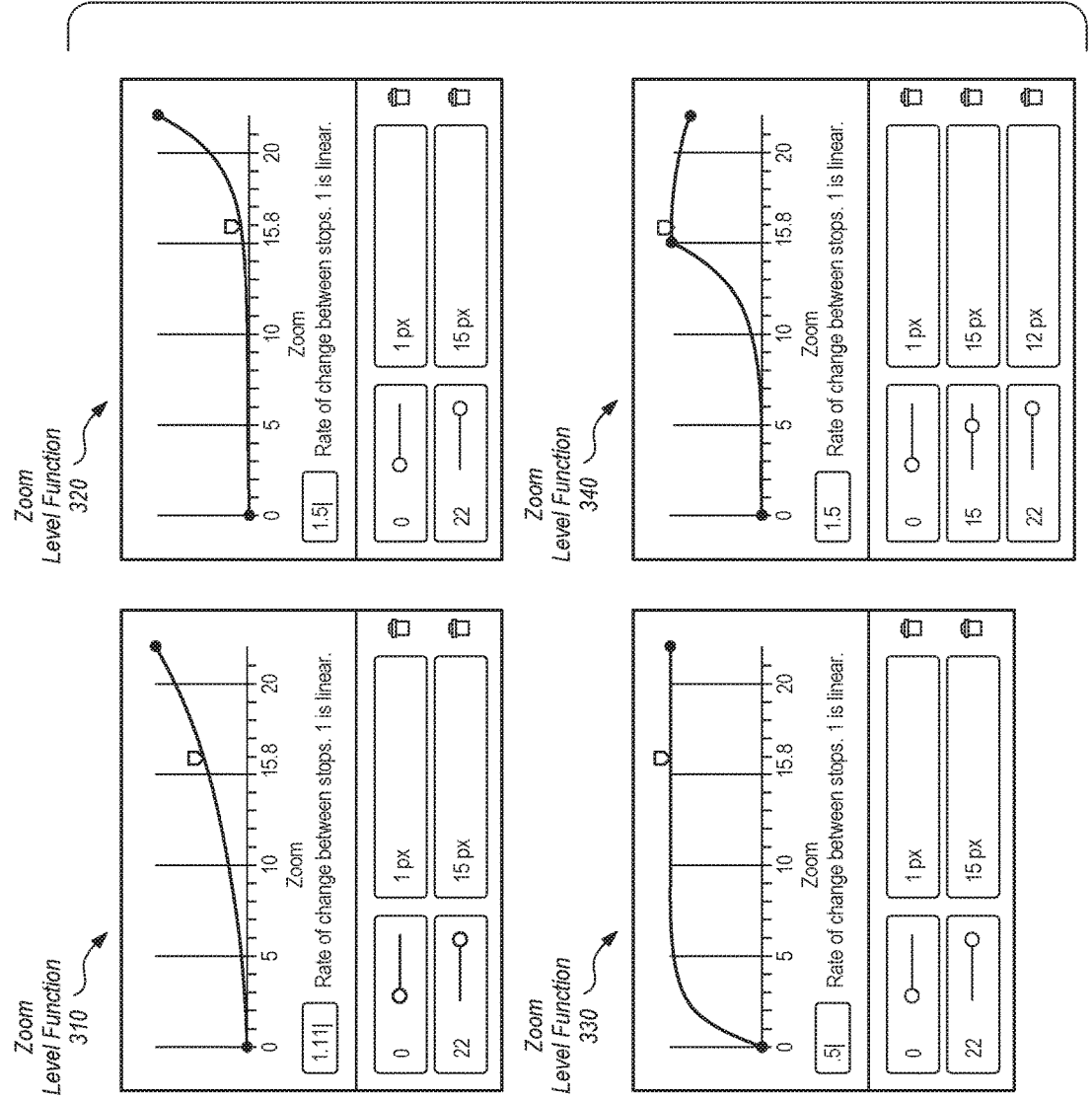
FIG. 3 graphically illustrates example zoom level functions.

Referring again to the process 600 of FIG. 6, from the determined 630 property values (e.g., selection of existing values or newly added or edited values), the server computer 105 generates 640 a zoom level function for the particular style layer property that assigns a continuous range of property values between the first property value and the second property value to a continuous range of zoom levels between the first zoom level and the second zoom level (e.g., as shown in FIG. 3).

If instead the selection of the zoom level control corresponding to a selected style layer property of the plurality of style layer properties has discrete values, the server computer 105 generates a zoom level step function for the selected style layer property that assigns a finite set of property values between the first property value and the second property value to the range of zoom levels between the first zoom level and the second zoom level.

The server computer 105 executing the mapping application 110 can provide 650, for display, a visual map (e.g., 230) at a selected zoom level, wherein the visual map is based on vector map tiles rendered according to the zoom level function.

For purposes of illustrating a clear example, assume a property value of 0 is associated with zoom level 0 and a property value of 22 is associated with zoom level 22. A zoom level function may be generated based on the two property values and the zoom levels they are associated with. The zoom level function assigns property values for zoom levels between zoom levels 0 and 22. For example, the zoom level function may be a linear function such that zoom level 1 is assigned a property value of 1, zoom level 4 is assigned a property value of 4, and etc.

As noted above, some property values have discrete values. A discrete value, such as Booleans, fonts, or other values that are selected from a finite set of values, does not have any in-between values. If a first property value is defined for a first zoom level and a second property value is defined for a second zoom level, zoom levels in between the first and second zoom level cannot be assigned a property value between the first and second property value. Instead, the property value only changes when the zoom level is at the second zoom level. In other words, the zoom level function for discrete values may be a step function, wherein points on the zoom level function correspond to each zoom level that has an associated property value.

In an embodiment, some property values have continuous values that can be changed incrementally when a zoom level changes incrementally. Example continuous values include numbers, colors, or other property values that can have a fractional value. Referring to the above example, a zoom level of 3.7 may be assigned a property value of 3.7. As another example, assume zoom level 1 for a color style layer property is assigned the color red, and zoom level 22 is assigned the color blue. Zoom levels between 1 and 22 would be assigned various shades of purple across a color gradient from red to blue. That is, zoom levels between 1 and 22 would be assigned colors that were between blue and red across the color gradient.

In an embodiment, if a style layer property can have continuous property values, then the zoom level function may be a non-linear function. For example, the zoom level function may be an exponential function, an inverse function, or any other type of non-linear function.

Additionally or alternatively, the curvature of the zoom level function may be based on a rate of change value. A rate of change value indicates a rate at which the output of a zoom level function changes.

Additional zoom levels also can be added. For example, user input can be received specifying a display zoom level of the plurality of zoom levels between the first zoom level and the second zoom level, and based on the zoom level function, a property value for the particular style layer property at the display zoom level may be determined and displayed.

Various rates of change can be specified as well. User input can be received specifying a rate of change value, where the curvature of the zoom level function is based on the specified rate of change value.

User input can further specify a third (fourth, fifth, etc.) property value to associate with a third (fourth, fifth, etc.) zoom level for the particular style layer property, and as a result the server computer 105 can generate additional zoom level function(s) for the particular style layer property that assigns an additional range of property values between the second property value and the third property value (and between additional values) to an additional range of zoom levels between the second zoom level and the third zoom level, etc. The rate of change input then can be specified separately for the different zoom level functions, where in addition to specifying a first rate of change value, where the curvature of the zoom level function is based on the first rate of change value, user input can specify a second rate of change value, wherein the curvature of the additional zoom level function(s) is/are based on the second (and further) rate of change value(s).

Referring now also to FIG. 3, it illustrates a visual representation of zoom level functions generated with different rate of change values. Each of zoom level functions 310, 320, and 330 have a property value of 1 associated with zoom level 0 and a property value of 15 associated with zoom level 22. In other words, zoom level functions 310, 320, and 330 are generated based on the same pair of property values.

For the purpose of illustrating a clear example, assume a rate of change value is between 0 and 1.9. A rate of change value of 1 may correspond to a linear zoom level function. Zoom level function 310 has a rate of change value of 1.11, zoom level function 320 has a rate of change value of 1.5, and zoom level function 330 a rate of change value of 0.5.

In the illustrated example, a rate of change value closer to 1 results in a zoom level function with a gentler curve. A rate of change value closer to 1.9 results in a zoom level function with a sharper, upward curve towards the end of the zoom level range. A rate of change value closer to 0 results in a zoom level function with a sharper, downward curve towards the beginning of the zoom level range.

In an embodiment, a style layer property may be associated with two or more zoom level functions. Each zoom level function may assign property values to a respective set of non-overlapping zoom levels. Referring to FIG. 3, zoom level function 340 has a property value of 1 associated with zoom level 0, a property value of 15 associated with zoom level 15, and a property value of 12 associated with zoom level 22. A first zoom level function is generated for zoom levels between 0 and 15, based on the associated property values of 1 and 15. A second zoom level function is generated for zoom levels between 15 and 22, based on the associated property values of 15 and 12. Additionally or alternatively, the style layer property may be associated with a single compound function that comprises the two or more zoom level functions.

In an embodiment, each zoom level function of the two or more zoom level functions may be generated based on the same rate of change value. Additionally or alternatively, a different rate of change may be specified for each property value pair, and each zoom level function may be generated based on a different rate of change value.

In an embodiment, if no property value is associated with the minimum zoom level, then the property value for zoom levels between the minimum zoom level and the first zoom level with which a property value is associated may be the same as the property value associated with the first zoom level. In other words, a zoom level function between the minimum zoom level and the first zoom level may be a constant function.

Similarly, if no property value is associated with the maximum zoom level, then the property value for zoom levels between the last zoom level with which a property value is associated and the maximum zoom level may be the same as the property value associated with the last zoom level.

Zoom Level Editor

In an embodiment, a map style editor includes a zoom level editor for specifying zoom-dependent style layer property values. A user may use the zoom level editor to define property values for different zoom levels. As part of the process 600 of FIG. 6, as the user makes changes to the values, the visual map (e.g., 230) is updated to reflect the changes. Specifically, in response to receiving user input editing a property value for a particular style layer property for at least one of the plurality of zoom levels, the server computer 105 executing the aping application 110 updates 660 the zoom level function for the particular style layer property and re-renders the visual map.

Further updates may cause the editor portion of the user interface to update as well. For example, initially the displayed property values in association with the first zoom level value and the second property value in association with the second zoom level value are based on an order of the first zoom level value and the second zoom level value for the particular style layer property. In response to receiving user input editing the property value for the particular style layer property to add a third zoom level between the first and second zoom level values, the first, second, and third zoom levels can be sorted into numerical order and then re-displayed based on the sorting.

Inserting a new zoom level between existing zoom levels can separate an existing zoom level function into two zoom level functions on each side of the new zoom level in between the prior values. For example, in response to receiving user input editing the property value for a particular style layer property to add a (new) third zoom level between the first and second zoom level values, the server computer 105 may generate a first partial zoom level function for the particular style layer property that assigns a range of property values between the first property value and the (new, intermediary) third property value to the range of zoom levels between the first zoom level and the third zoom level and generate a second partial zoom level function for the particular style layer property that assigns a range of property values between the (new) third property value and the second property value to the range of zoom levels between the third zoom level and the second zoom level.

Figure 4:
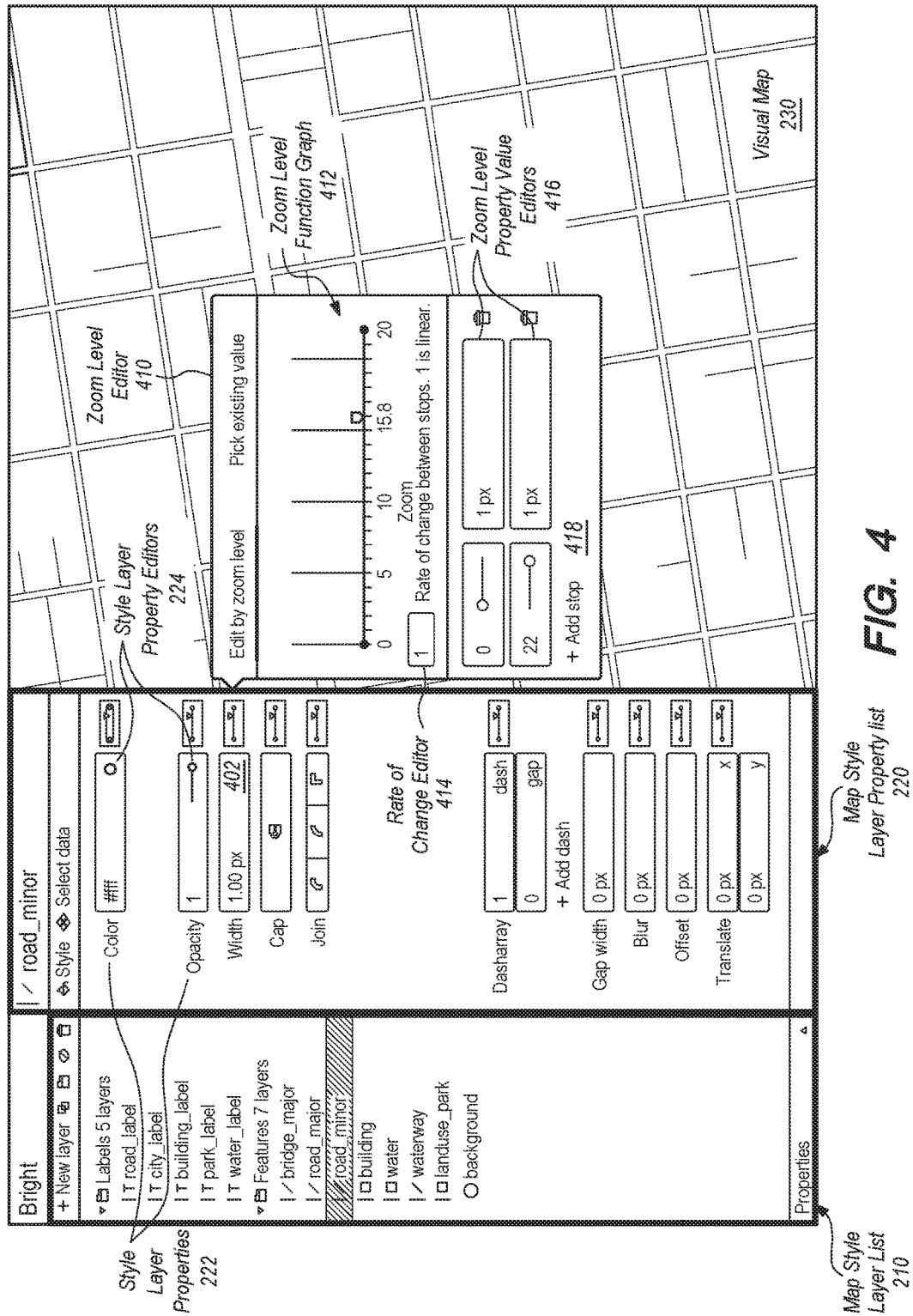
FIG. 4 illustrates a zoom level editor of a map style editor, according to an embodiment.

Referring now also to FIG. 4, it illustrates an example zoom level editor of a map style editor. In the illustrated embodiment, style layer properties of style layer property list 220 include a zoom level editor button, such as zoom level editor button 402 for the "Width" property. In an embodiment, selecting a zoom level editor button 402 displays a zoom level editor 410 for the corresponding style layer property. In FIG. 4, zoom level editor 410 includes a zoom level function graph 412, a rate of change editor 414, two or more zoom level property value editors 316, and an "add stop" button 418.

Zoom level function graph 412 is a visual representation of one or more property values in relation to the plurality of zoom levels at which the digital map may be displayed. In an embodiment, zoom level function graph 412 is a visual representation of one or more zoom level functions associated with the selected style layer property. Additionally or alternatively, zoom level function graph 412 indicates a current zoom level at which visual map 230 is displayed.

In the example illustrated in FIG. 4, zoom level 0 and zoom level 22 are both assigned a property value of 1 px. Thus, the style layer property has not been associated with a zoom level function. Zoom level function graph 412 displays a flat line indicating the same property value across all zoom levels. If a user selects or specifies a different property value for either zoom level 0 or zoom level 22, then a zoom level function may be generated based on the two property values.

Zoom level property value editor 416 is a graphical editor that allows a user to select or specify a zoom level and a corresponding property value to associate with the zoom level. In an embodiment, zoom level property editor 416 includes a property value editor of the same type as the property editor shown in style layer property list 220. Additionally or alternatively, selecting the property editor may display a graphical editor where a user may select an existing value for the same style layer property used in other style layers. In an embodiment, a user may select an existing zoom level function that is associated with a second style layer property. The existing zoom level function is copied and associated with the selected style layer property. Additionally or alternatively, the property value-zoom level pairs defined in the second style layer property may be displayed in the zoom level property editor 416.

In an embodiment, when a user specifies a second property value, the map style editor automatically generates a zoom level function based on the first property value and the second property value.

FIG. 5 illustrates zoom level editor 316 after a second property value has been specified. In FIG. 5, zoom level 22 is associated with a property value of 15 px. Based on a property value of 1 px at zoom level 0 and a property value of 15 px at zoom level 22, a zoom level function is generated that assigns property values for zoom levels between 0 and 22.

Additionally or alternatively, the zoom level function may be generated based on a rate of change value. A user may specify a rate of change value using rate of change editor 414. In the present example, the rate of change is set to 1 so the zoom level function is a linear function. If a user modifies the rate of change value, the map style editor may generate an updated zoom level function.

In an embodiment, the map style editor may update the zoom level function graph 412 based on the generated zoom level function. As illustrated in FIG. 5, the zoom level function graph 412 depicts a linear graph starting at 1 px at 0 and increasing to 15 px at 22.

In an embodiment, the map style editor may update the graphical user interface to display the updated property value. As indicated in the zoom level function graph 412, the current zoom level of visual map 230 is 15.8. A new property value for zoom level 15.8 may be calculated based on the generated zoom level function. The style layer property editor 224 for the Width property is updated to indicate that the Width property value is 11.07 px, rather than 1 px.

In an embodiment, visual map 230 may be re-displayed based on the generated zoom level function. The map style editor may re-render the visual map 230 using the new property value for the style layer property. In the illustrated example, streets shown in visual map 230 are re-drawn with a width of 11.07 px rather than a width of 1 px.

In an embodiment, if a user zooms in or out on visual map 230, the map style editor may re-display the visual map at an updated zoom level. Re-displaying the visual map at an updated zoom level may include determining an updated property value assigned to the updated zoom level using the generated zoom level function. The map style editor may render the visual map 230 using the updated property value. Additionally or alternatively, the map style editor may update style layer property editor 224 to indicate the updated property value.

In an embodiment, zoom level editor 410 includes an "add stop" button 418. The "add stop" button 418 causes an additional zoom level property editor 416 to be displayed. Each time an additional property value and zoom level is specified, one or more additional zoom level functions may be generated based on the additional property value and zoom level. The number of additional zoom level functions may depend on whether the additional zoom level is outside-of or in-between already defined zoom levels. Additionally or alternatively, the zoom levels may be sorted before generating the one or more additional zoom levels. For example, if property values are specified for zoom levels 0 and 22 and a third zoom level of 15 is added, the zoom values may be sorted from smallest to largest. Two zoom level functions are generated—one for zoom levels between 0 and 15 and another for zoom levels between 15 and 22.

FIG. 5 illustrates zoom level editor 410 after an additional zoom level is assigned a property value. Zoom level 10 is assigned a property value of 4 px. Zoom level 10 is between zoom level 0 and zoom level 22. Thus, the map style editor generates two zoom level functions. A first zoom level function is generated for zoom levels between 0 and 10. A second zoom level function is generated for zoom levels between 10 and 22. The zoom level function graph 412 is updated to include two lines, each representing one of the two zoom level functions. Additionally, the style layer property editor 224 is updated to indicate that the Width property value is 9.34. Visual map 230 is re-displayed with an updated width for streets.

In an embodiment, after the zoom level function is generated, the zoom level function may be stored in map style data 140 in association with the corresponding style layer property. The map style editor may automatically cause updated map style data to be uploaded or saved to database 120 after any change is made to the map style. Additionally or alternatively, the map style editor may periodically upload or save updated map style data to database 120. Additionally or alternatively, the map style editor may store update map style data in memory, and upload or save the stored map style upon a user action, such as clicking a "save" button or closing the map style editor.

In an embodiment, storing the zoom level function comprises modifying a map style document to include the zoom level function. For example, style layer data for a map style layer may specify a zoom level function as the value of a style layer property. Additionally or alternatively, the zoom level function may be stored separate from the style layer data. The style layer data may include a reference to the zoom level function.

Rendering Visual Maps Based on Zoom Level

As described above, a map application or a browser may request one or more map tiles and process the map tiles to cause display of a visual map at a particular zoom level. The request may specify a particular map style. Map style data corresponding to the particular map style may be received in conjunction with the one or more map tiles. The map application or browser may render the requested map tiles based on visual style rules specified in the map style data.

In an embodiment, the particular map style may include zoom-dependent styling. One or more style layers of the map style may include a style layer property that is associated with a zoom level function. If a style layer property is associated with a zoom level function, a map application determines the zoom level at which the visual map is being displayed. The zoom level may be inputted into the zoom level function to output a property value for the style layer property. The property value is used when rendering map features styled by the style layer.

In an embodiment, if the zoom level of the visual map changes, the map application or browser may re-display the visual map at the updated zoom level. The updated zoom level may be inputted into the zoom level function to determine an updated property value for the style layer property. The visual map may be updated or re-rendered using the updated property value. Additionally or alternatively, the map application or browser may request one or more updated map tiles corresponding to the updated zoom level. The updated zoom level may be inputted into the zoom level function to output a property value for the style layer property. The property value is used when rendering map features in the one or more updated map tiles that are styled by the style layer.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of representing style layer properties at various zoom levels, comprising:

maintaining a style sheet for a digital map, wherein:

the style sheet comprises a plurality of style layers, each style layer corresponding to a data layer that is separate from the style layer, each of the plurality of style layers comprises a plurality of style layer properties defining visual representations within the digital map of map features within the data layer corresponding to the style layer, and each data layer comprises a subset of electronic map data representing map features of a particular type;

for a particular style layer of the plurality of style layers:
receiving a first property value for a first zoom level of a particular style layer property of the particular style layer;
receiving a second property value for a second zoom level of the particular style layer property of the particular style layer; and
generating a zoom level function for the particular style layer property that assigns a continuous range of property values between the first property value and the second property value to a continuous range of zoom levels between the first zoom level and the second zoom level; and sending for display the digital map at a particular zoom level, wherein the digital map comprises one or more map features of the data layer corresponding to the particular style layer visually represented within the digital map based on the generated zoom level function.

2. The method of claim 1, further comprising receiving selection of the particular style layer from a plurality of style layers.

3. The method of claim 1, further comprising displaying the plurality of style layer properties for the particular style layer.

4. The method of claim 1, further comprising receiving user input, wherein the first property value is based on the received user input.

5. The method of claim 1, further comprising receiving selection of zoom level control corresponding to the particular style layer property.

6. The method of claim 5, further comprising, in response to receiving selection of the zoom level control corresponding to the particular style layer property of the plurality of style layer properties having discrete values, generating a zoom level step function for the particular style layer property that assigns a finite set of property values between the first property value and the second property value to the range of zoom levels between the first zoom level and the second zoom level.

7. The method of claim 1, further comprising:
receiving user input specifying a display zoom level of the plurality of zoom levels between the first zoom level and the second zoom level;
determining, based on the generated zoom level function, a property value for the particular style layer property at the display zoom level; and
displaying the property value for the particular style layer property at the display zoom level.

8. The method of claim 1, further comprising receiving user input specifying a rate of change value, wherein a curvature of the zoom level function is based on the specified rate of change value.

9. The method of claim 1, further comprising:
receiving user input specifying a third property value to associate with a third zoom level for the particular style layer property; and generating an additional zoom level function for the particular style layer property that assigns an additional range of property values between the second property value and the third property value to an additional range of zoom levels between the second zoom level and the third zoom level.

10. The method of claim 9, further comprising:
receiving user input specifying a first rate of change value, wherein a curvature of the zoom level function is based on the first rate of change value; and
receiving user input specifying a second rate of change value, wherein a curvature of the additional zoom level function is based on the second rate of change value.

11. The method of claim 1, further comprising:
based on an order of the first zoom level value and the second zoom level value for the particular style layer property, displaying the first property value in association with the first zoom level value and the second property value in association with the second zoom level value; and
in response to receiving user input editing the property value for the particular style layer property to add a third zoom level between the first and second zoom level values:
sorting the first, second, and third zoom levels into numerical order; and
re-displaying the first, second, and third zoom levels based on the sorting.

12. The method of claim 11, further comprising, in response to receiving user input editing the property value for the particular style layer property to add a third zoom level between the first and second zoom level values:
generating a first partial zoom level function for the particular style layer property that assigns a range of property values between the first property value and the third property value to the range of zoom levels between the first zoom level and the third zoom level; and
generating a second partial zoom level function for the particular style layer property that assigns a range of property values between the third property value and the second property value to the range of zoom levels between the third zoom level and the second zoom level.

13. The method of claim 1, wherein each style layer of the plurality of style layers comprises a style layer type, the method further comprising:
receiving a selection of two or more style layers of the plurality of style layers of similar style layer type;
receiving a third property value for a third zoom level of a particular style layer property of the selected two or more style layers of similar style layer type;
receiving a fourth property value for a fourth zoom level of the particular style layer property of the selected two or more style layers of similar style layer type;
generating a second zoom level function for the particular style layer property of the selected two or more style layers of similar style layer type that assigns a continuous range of property values between the third property value and the fourth property value to a continuous range of zoom levels between the third zoom level and the fourth zoom level; and
sending for display the digital map at another zoom level, wherein the digital map comprises one or more map features of two or more data layers corresponding to the two or more style layers of similar style layer type visually represented within the digital map based on the generated second zoom level function.

14. The method of claim 1, wherein at least one of the style layer properties in the maintained style sheet for the digital map is defined by a first organization, the method further comprising:
maintaining a second style sheet comprising a style layer that comprises a style layer property defined by a second organization different from the first organization,
wherein the definition of the style layer property defined by the second organization differs from the definition of a corresponding style layer property in the maintained style sheet defined by the first organization.

15. The method of claim 1, wherein the style sheet is stored as a document separate from the data layers.

16. A server computer comprising:
one or more processors;
a memory coupled to the one or more processors and storing program instructions which, when executed using the one or more processors, cause the one or more processors to perform:
maintaining a style sheet for a digital map, wherein:
the style sheet comprises a plurality of style layers, each style layer corresponding to a data layer that is separate from the style layer,
each of the plurality of style layers comprises a plurality of style layer properties defining visual representation within the digital map of map features within the data layer corresponding to the style layer, and
each data layer comprises a subset of electronic map data representing map features of a particular type;
for a particular style layer of the plurality of style layers:
receiving a first property value for a first zoom level of a particular style layer property of the particular style layer;
receiving a second property value for a second zoom level of the particular style layer property of the particular style layer; and
generating a zoom level function for the particular style layer property that assigns a continuous range of property values between the first property value and the second property value to a continuous range of zoom levels between the first zoom level and the second zoom level; and
sending for display the digital map at a particular zoom level, wherein the digital map comprises one or more map features of the data layer corresponding to the particular style layer visually represented within the digital map based on the generated zoom level function.

17. The server computer of claim 16, the program instructions which, when executed by the one or more processors, further cause the one or more processors to perform, in response to receiving selection of a zoom level control corresponding to a selected style layer property of the plurality of style layer properties having discrete values, generating a zoom level step function for the selected style layer property that assigns a finite set of property values between the first property value and the second property value to the range of zoom levels between the first zoom level and the second zoom level.

18. The server computer of claim 16, the program instructions which, when executed by the one or more processors, further cause the one or more processors to perform:
receiving user input specifying a display zoom level of the plurality of zoom levels between the first zoom level and the second zoom level;
determining, based on the generated zoom level function, a property value for the particular style layer property at the display zoom level; and
displaying the property value for the particular style layer property at the display zoom level.

19. The server computer of claim 16, the program instructions which, when executed by the one or more processors, further cause the one or more processors to perform receiving user input specifying a rate of change value, wherein a curvature of the zoom level function is based on the specified rate of change value.

20. The server computer of claim 19, the program instructions which, when executed by the one or more processors, further cause the one or more processors to perform, in response to receiving user input editing the property value for the particular style layer property to add a third zoom level between the first and second zoom level values:
generating a first partial zoom level function for the particular style layer property that assigns a range of property values between the first property value and the third property value to the range of zoom levels between the first zoom level and the third zoom level; and
generating a second partial zoom level function for the particular style layer property that assigns a range of property values between the third property value and the second property value to the range of zoom levels between the third zoom level and the second zoom level.

* * * * *